(No Model.) 2 Sheets—Sheet 1.
C. MUEHLEISEN.
CHANGEABLE SPEED GEARING.
No. 542,095. Patented July 2, 1895.
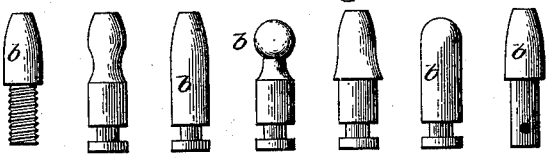
Fig. 1.
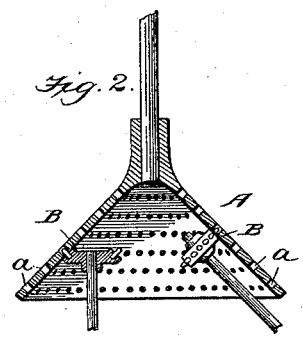
Fig. 2.
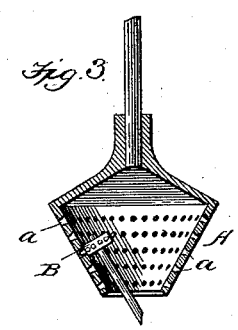
Fig. 3.
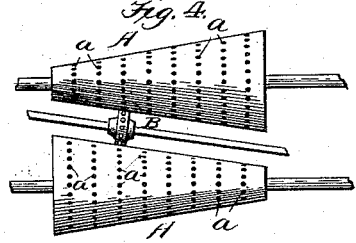
Fig. 4.
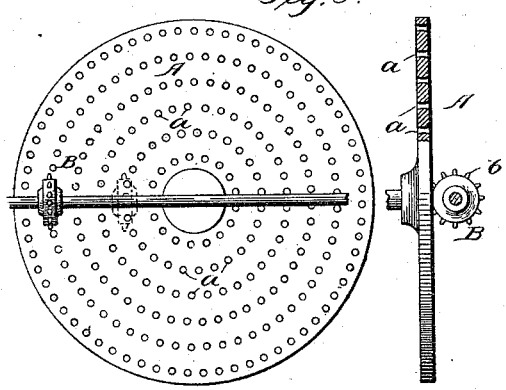
Fig. 5.
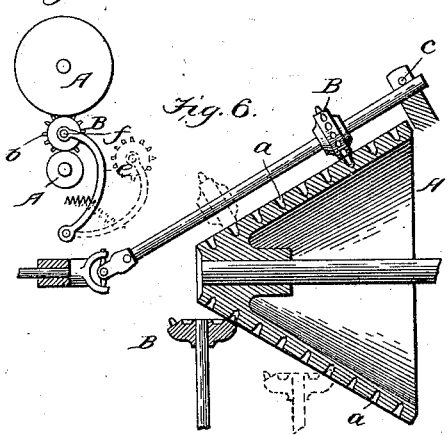
Fig. 4.ª  Fig. 6.
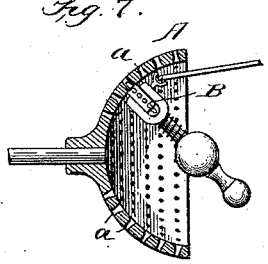
Fig. 7.
Fig. 8.
witnesses.
A. A. Johnson
G. M. Copenhaver.
inventor
Carl Muehleisen
by Johnson & Johnson
his Attorneys.

(No Model.) 2 Sheets—Sheet 2.
C. MUEHLEISEN.
CHANGEABLE SPEED GEARING.
No. 542,095. Patented July 2, 1895.
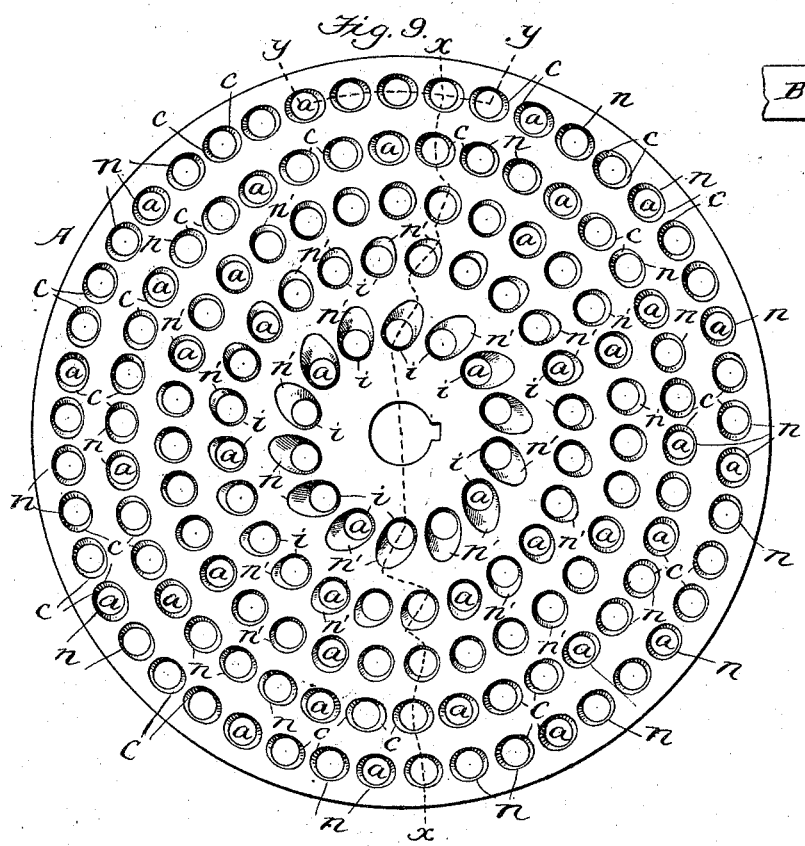
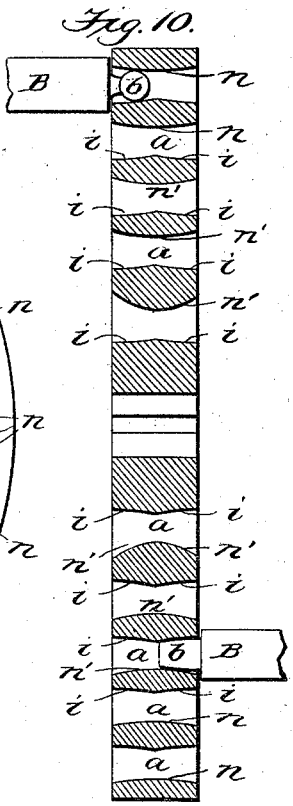
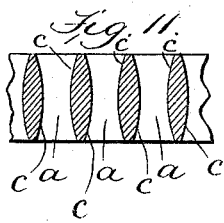
WITNESSES:
INVENTOR
ATTORNEYS

UNITED STATES PATENT OFFICE.

CARL MUEHLEISEN, OF BALTIMORE, MARYLAND.

CHANGEABLE-SPEED GEARING.

SPECIFICATION forming part of Letters Patent No. 542,095, dated July 2, 1895.

Application filed March 29, 1894. Serial No. 505,543. (No model.)

*To all whom it may concern:*

Be it known that I, CARL MUEHLEISEN, a subject of the Emperor of Germany, (having in due form of law declared my intention of becoming a citizen of the United States,) residing at the city of Baltimore, in the State of Maryland, have invented certain new and useful Improvements in Changeable-Speed Gearing, of which the following is a specification.

My invention is directed to the production of an improved male and female gearing for changing speed, and is particularly adapted for gearing of the conical type for operating the spindle or gearing of metal-working machines requiring different speeds. Its construction and adaptation are such as to give an easy and quick change of speed in the transmission of power from one shaft to another and in the capacity for adjusting the gearing to suit the requirement for its use.

The objects of the improved construction are to obtain the largest capacity for speed-changing surface in the smallest gear; to permit gear-wheels of unequal size to be used in different positions relatively and in any position of the power-transmitting shaft, and maintain the full working-surface of the teeth in every position of the wheels.

The precise matter of improvement will be pointed out in the claims concluding this specification.

In the accompanying drawings I have shown a changeable male and female gear embodying my invention, and in which—

Figure 1 shows different forms of the male teeth, all having round working ends adapted for engagement with the female teeth. Figs. 2 and 3 show in section hollow conical gear open at one end, having inner and outer smooth surfaces with female teeth and pinions engaging the inner walls of the cones. Fig. 4 shows two cones having smooth surfaces with female teeth, and between the cones a pinion, made adjustable to give a variety of speed in a given space. Fig. 4ª shows in end view the pair of cones in Fig. 4 and the manner of mounting the male gear between the cones to permit the disengagement of the male gear for adjustment in the female teeth along the smooth surfaces of the cones. Fig. 5 shows a disk-gear in face view and section, having female teeth arranged in concentric circles on its opposite sides and an engaging-pinion operating the same as the conical gear to produce different speed. Fig. 6 shows in section a conical gear with female teeth and engaging-pinions on its outer wall, arranged to produce different speed. Figs. 7 and 8 show hollow conical gear open at one end, having curved walls and female teeth and both external and internal engaging-pinions. Fig. 9 shows an enlarged view of the gear shown in Fig. 5, and Fig. 10 is a cross-section of the same on the zigzag line $x\,x$ of Fig. 9, and Fig. 11 is a detail section on the line $y\,y$ of Fig. 9, these three figures illustrating more clearly the construction of the female teeth, flaring at both ends, as applied to the disk-gear; but it is obvious that the holes in the smooth surfaces of all the cones must have flaring ends at one or at both ends to allow of the engagement of the teeth shown in Fig. 1 to obtain the full working-surface of the teeth in every position of the wheels.

The gear A, having the female teeth, may have any desired shape of working-surface; but such surface must be smooth and the holes $a$ forming the teeth must have flaring ends at such surface and arranged in concentric circles therein. The engaging-gear B, having the projecting teeth $b$, may have its shaft parallel with or at any desired angle to the said surface, and such gear is adapted for adjustment on its shaft to obtain the engagement that will give the required speed. For this purpose the male teeth (shown in Fig. 1) must have rounded or convex working ends $b$ to give a convex contact-wall upon the walls of the female teeth, as illustrated in Fig. 10. Such teeth having ball working ends are especially adapted for allowing the male gear to work at any angle to the female teeth. As the female teeth are arranged in concentric circles upon the surface of the gear their ends must flare in such a way as to permit the same male wheel B to work in any one of the circles of holes, and for this purpose the shape and direction of the flaring ends must change somewhat as they approach the center of the gear, because of the gradually-decreasing diameter of the circles of holes. This is illustrated best in the enlarged views of Figs. 9, 10, and 11. As the male gear travels in a circle, the walls of the holes must be such as to permit such circular travel of the male teeth in the holes in the different circles. At the working-surface the circles of holes near the circumference of the gear—say the two outer rows—will flare at their ends in the direct line of the circle to give an oval shape, while those holes near the center of the gear will all flare at their ends in an oblique direction away from the center, and such oblique flaring must be greatest in extent in the circle of least diameter to allow the male teeth to freely enter any of the holes, as seen in Fig. 9, it being understood that all the holes must be the same distance apart, so that the teeth of the male wheel will engage any of them. In several of the outer circles of holes the flaring of the walls will be symmetrically convex at the opposite sides $c$ $c$ of the hole in the line of the circle, as seen in Figs. 9 and 11, and which correspond to the oval ends of the holes. The walls of such holes at that side toward the circumference of the gear will be correspondingly convex, as seen at $n$ in Fig. 10. In fact, those sides of all the holes which stand toward the circumference of the wheel are convex, as seen at $n$ $n'$, Fig. 10, and it will be seen at $n'$ that the degree of such convexity increases in the holes as they near the center of the wheel, and it is this increase of such convexity that gives the increased flare at one side of the end of the hole, as seen in Fig. 9.

The walls of all the holes at their sides toward the center of the wheel are concave, as seen at $i$ in Fig. 10, and these concave walls correspond to the changing positions of the convex walls caused by the oblique positions of the flaring sides $n'$ of the holes, and such concavity is lengthwise of the holes. This convex construction of the female teeth allows the teeth of the male pinion to freely enter and work with bearing contact in the holes of the different circles in the face of the gear, while the concave construction prevents the teeth from binding in leaving the holes, and it will be understood that the female teeth of all the gear shown and of whatever form must be of the same construction to permit of the working of the pinions as shown in the several gear.

Now, looking at these two sectional views, Figs. 10 and 11, it will be seen that they show the form of the four opposite sides of the holes; that each hole is symmetrically convex on two of its opposite sides, made so by the flare of the hole, as at $c$ $c$, Fig. 11; that the other opposite sides of the said hole are convex, as at $n'$ $n$, and concave, as at $i$, Fig. 10, and it will be understood that this is the construction which gives the perfect bearing action of the male teeth in entering and perfect freedom of the teeth in leaving the holes. The flaring of the holes obliquely at one side only, as at $n'$ in Fig. 9, is to permit the male teeth to enter them with an easy bearing contact on the convex side when the pinion is set to work in any one of the smaller circles of the holes, and the concave side prevents the teeth from binding in leaving the holes. In other words, the flaring ends of the holes must be elongated symmetrically at two opposite sides to make the hole oval in the larger circles and elongated at one side only in the smaller circles in an oblique direction away from the center, whereby the same pinion is adapted to work in female teeth arranged in concentric circles, whether the female gear is caused to revolve to the right or to the left. Fig. 11, being taken on the line $y$ $y$ of Fig. 9, shows the walls of the holes convex on their opposite sides in the line of the circle of the holes, while Fig. 10, being taken on a diameter-line of the wheel, shows the wall $n$ $n'$ of said holes as being convex and the opposite walls $i$ of the same holes as being concave lengthwise of said holes.

This construction of male and female teeth permits the adjustment of the male gear from the minimum to the maximum, or to any intermediate degree, with little trouble. It permits the power-transmitting shaft of the male gear to be arranged outside of or inside of the female gear. It permits separate power-shafts to be used, one on the inner and one on the outer side of the female gear, and permits such power-transmitting shaft to be pivoted or jointed for convenient application and adjustment in such relation. It permits such shaft to be jointed and mounted to have any angle or position in relation to the female gear. It permits the teeth of the female gear to be formed in smooth surfaces by drilling and milling or casting, and either upon a convex, concave, or flat surface. It permits the male gear to be movable upon or with the shaft in the relative adjustment of the engaging-gear to change the speed, and it gives greatly-increased capacity of speed-changing surface. It permits the female teeth to be extended through the walls of the gear to form teeth on opposite working sides, and thereby allow the working of the male gear on either the inner or the outer wall, or both, of a gear. The described construction permits the engaging male teeth to be radially set in relation to the axis of the wheel, or to be set at an oblique angle to such axis, as in Fig. 6. As shown in the drawings, the working-faces of the female gear are parallel, and when the teeth are made in both faces the walls are sufficiently thick for that purpose, as seen in Figs. 5 and 10.

Referring to Fig. 4$^a$, the cone-gear are mounted in fixed bearings, and to permit of the adjustment therewith of the intermediate male gear to change the speed it is mounted in a swing-frame $e$, with its shaft $f$ parallel to the cone-surfaces, and which shaft may form a handle by which to move out the shaft to change the position of the wheel B between the cones. For this purpose the shaft is made movable with the frame $e$, which is mounted so that it can be swung out at one side from between the cones to disengage its male gear therefrom and allow it to be changed toward either end of the cones in position to change the speed and the power and be again engaged with the cones. For this purpose the male gear may be movable on its shaft, and any suitable means may be provided for maintaining the swing-frame in its position between the cones. In this construction the intermediate gear is merely the medium for changing the speed, the power being transmitted by one of the cones.

In Fig. 6 pinions having projecting teeth are shown in engagement with both sides of a conical smooth-faced gear, and in this case the power is transmitted through the shafts of the male wheels. The shaft of one of these gear is shown as having a universal joint, and its gear is held in engagement by a locking-pin $c'$ in the bearing of said shaft, so that this end of the latter can be moved out from the cone-gear to allow the shifting of the speed-changing gear, which is free to be slid upon its shaft for this purpose.

It will be understood that my invention is adapted for use on any machine where an easy and quick change of speed or power, or both, is required.

It will also be understood that one female gear can work with one, two, or more male gear, each having its own shaft-driving connecting mechanism.

The male gear used with ball-formed teeth will allow of its use in an inclined position with a speed power-gear without interfering with the correct working of the teeth, and this with a male gear on one or both sides of the speed-gear, and, in fact, my invention allows the coacting gear to be used in any relation to each other and in any position of the power-transmitting shaft.

It will be understood that when the female gear is used in the form of a cone the size and flare of the teeth-forming holes will be made to suit the angle and diameter of the conical surface.

In an application for a patent filed by me of even date herewith I have described and claimed gear-wheels the engaging teeth whereof have working convex walls of circular cross-section, and I do not herein claim such construction of teeth nor any construction set out or shown in the said application.

I claim as my improvement—

1. A speed-gear having its working face formed with holes arranged in concentric circles forming female teeth their walls flaring to the working face of the gear and being both convex and concave lengthwise of said holes, substantially as described.

2. A speed gear-wheel having its working face formed with holes arranged in concentric circles, the walls of the holes of the several circles flaring to the working face of the gear and having said walls concave at $i$ on that side at which the male-tooth leaves the hole and convex on the other sides $c$, $c$ and $n$, the said convex walls increasing the arc of such convexity as at $n'$ as the several circles of holes approach the center of the wheel, to cause the flare at the ends of the holes to stand in an oblique direction at one side of said hole toward the circumference of the wheel, as shown and described for the purpose stated.

3. A speed-gear composed of two engaging gear the one having working faces on opposite sides formed with holes arranged in concentric circles forming female-teeth their walls flaring to the working face of the gear and having their walls both convex and concave, the other gear having teeth formed of round cross section at their working ends and adapted to engage the flaring walls of the holes, substantially as described.

4. A speed-gear constructed with smooth faces of parallel walls and holes extending through to both walls, the holes having their walls flaring to each end and made both convex and concave lengthwise of said holes, whereby to form symmetrical female teeth on both faces of the gear in the way shown and described and for the purpose stated.

CARL MUEHLEISEN.

Witnesses:
GEORGE S. BOOKER,
CLARENCE G. WESCOTT.